United States Patent
Yuan et al.

(10) Patent No.: US 10,386,544 B2
(45) Date of Patent: Aug. 20, 2019

(54) SOLAR POWER FORECASTING USING MIXTURE OF PROBABILISTIC PRINCIPAL COMPONENT ANALYZERS

(71) Applicant: Siemens Aktiengesellschaft, Munich (DE)

(72) Inventors: Chao Yuan, Plainsboro, NJ (US); Amit Chakraborty, East Windsor, NJ (US); Holger Hackstein, Dietzenbach (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 244 days.

(21) Appl. No.: 15/320,899

(22) PCT Filed: Jun. 29, 2015

(86) PCT No.: PCT/US2015/038240
§ 371 (c)(1),
(2) Date: Dec. 21, 2016

(87) PCT Pub. No.: WO2016/003861
PCT Pub. Date: Jan. 7, 2016

(65) Prior Publication Data
US 2017/0205537 A1    Jul. 20, 2017

Related U.S. Application Data

(60) Provisional application No. 62/018,817, filed on Jun. 30, 2014.

(51) Int. Cl.
*G01W 1/10* (2006.01)
*G06Q 10/04* (2012.01)
(Continued)

(52) U.S. Cl.
CPC ............... *G01W 1/10* (2013.01); *G01W 1/12* (2013.01); *G06F 17/18* (2013.01); *G06N 7/005* (2013.01); *G06Q 10/04* (2013.01); *G06Q 50/06* (2013.01)

(58) Field of Classification Search
CPC .......... G01W 1/12; G01W 1/10; G06Q 10/04; G06N 7/005
(Continued)

(56) References Cited

U.S. PATENT DOCUMENTS 7,580,817 B2 * 8/2009 Bing ................. G01W 1/10 703/6
9,753,455 B2 * 9/2017 Drees .................. G05B 15/02
(Continued)

OTHER PUBLICATIONS

International Search Report dated Sep. 9, 2015; Application No. PCT/US2015/038240; Filing Date: Jun, 29, 2015; 13-pages.
(Continued)

*Primary Examiner* — Stephanie E Bloss

(57) ABSTRACT

A method for solar forecasting includes receiving a plurality of solar energy data as a function of time of day at a first time, forecasting from the solar energy data a mode, where the mode is a sunny day, a cloudy day, or an overcast day, and the forecast predicts the mode for a next solar energy datum, receiving the next solar energy datum, updating a probability distribution function (pdf) of the next solar energy datum given the mode, updating a pdf of the mode for the next solar energy datum from the updated pdf of the new solar energy datum given the mode, forecasting a plurality of future unobserved solar energy data from the updated pdf of the mode, where the plurality of future unobserved solar energy data and the plurality of solar energy data have a Gaussian distribution for a given mode determined from training data.

23 Claims, 7 Drawing Sheets

(51) Int. Cl.
*G06N 7/00* (2006.01)
*G01W 1/12* (2006.01)
*G06F 17/18* (2006.01)
*G06Q 50/06* (2012.01)

(58) Field of Classification Search
USPC .............................................. 702/3
See application file for complete search history.

(56) References Cited

U.S. PATENT DOCUMENTS

| | | | |
|---|---|---|---|
| 2006/0116920 A1* | 6/2006 | Shan ................ | G06Q 10/04 705/7.11 |
| 2010/0185337 A1 | 7/2010 | Le Pivert | |
| 2010/0299287 A1* | 11/2010 | Cao ................ | H04L 41/142 706/12 |
| 2013/0054662 A1* | 2/2013 | Coimbra ............ | G06F 17/18 708/230 |
| 2013/0262049 A1* | 10/2013 | Zhang ............... | G06Q 50/06 703/2 |
| 2014/0278108 A1* | 9/2014 | Kerrigan ............ | G01W 1/10 702/3 |

OTHER PUBLICATIONS

M. Bouzerdoum et al: "A hybrid model (SARIMA-SVM) for short-term power forecasting of a small-scale grid-connected photovoltaic plant". Solar Energy. vol. 98. Dec. 1, 2013 (Dec. 1, 2013). pp. 226-235. XP055209857. / Dec. 1, 2013.

Goh T N et al: "Stochastic modeling and forecasting of solar radiation data". Solar Energy. Pergamon Press. OXFORD. GB. vol. 19. No. 6. 1977. pp. 755-757. XP025444181.

Hugo T C Pedro et al: "Assessment of forecasting techniques for solar power production with no exogenous inputs". Solar Energy. Pergamon Press. Oxford. GB. vol. 86. No. 7. Apr. 6, 2012 (Apr. 6, 2012). pp. 2017-2028. XP028511578 / Apr. 6, 2012.

Tyler C Mccandless et al: "Short Term 1-24 Solar Radiation Forecasts Using Weather Regime-Dependent J3.5 Artificial Intelligence Techniques", 12th Conference on Artificial and Computational Intelligence and its Applications to the Environmental Sciences, Feb. 1, 2014 (Feb. 1, 2014), XP055209839 /.

* cited by examiner

SOLAR POWER FORECASTING USING MIXTURE OF PROBABILISTIC PRINCIPAL COMPONENT ANALYZERS

CROSS REFERENCE TO RELATED UNITED STATES APPLICATIONS

This application claims priority from "Solar Power Forecasting Using Mixture Of Probabilistic Principal Component Analyzers", U.S. Provisional Application No. 62/018,817 of Yuan, et al., filed Jun. 30, 2014, the contents of which are herein incorporated by reference in their entirety.

TECHNICAL FIELD

This application is directed to time series forecasting using mixture models as applied to solar power use.

DISCUSSION OF THE RELATED ART

Forecasting solar power is an important routine for managing power grids. This task is challenging because solar power is non-stationary and can change dramatically within a short period of time. Despite its widespread integration in power grids, solar energy is not as reliable as traditional fossil energy. It is subject to many uncertain environment and weather factors, in particular, the cloud coverage. Being able to forecast solar energy accurately is of ultimate importance for managing a power grid.

Forecasting solar energy is easy on a sunny day when the signal is mostly smooth. However, the task becomes quite challenging on a cloudy day. First, the signal frequently changes rapidly on a cloudy day; its value can be dramatically different within minutes, mostly due to wind-induced cloud movement. Second, solar power is highly non-stationary: its value range is quite different at different time of a day. Finally, a sunny morning can turn into a cloudy afternoon. Therefore, a good forecasting algorithm should be able to handle signal variations adaptively.

FIG. 1 illustrates examples of solar energy consumption. The horizontal axis indicates time, in minutes between 8:00 AM and 8:10 PM, and the vertical axis indicates solar power usage, normalized such that the peak is near one. As shown, there are four days including a sunny day 11, a cloudy day 12, a overcast day 13 and another mostly sunny day 14. A sunny day is easy to forecast because the signal is mostly smooth. The cloudy day and overcast day are much more challenging when solar power changes dramatically. Due to seasonal change, solar power is subject to shifting, (sunny day 11 vs. mostly sunny day 14) and stretching (cloudy day 12 vs. mostly sunny day 14). Solar power is non-stationary, because at different time stamps, the distribution of values is quite different.

Previous work has used additional information, such as weather forecasting, cloud cover forecasting from satellite images or camera images, as exogenous variables to improve forecasting performance. However, such information is not readily available.

Linear models such as autoregressive (AR), autoregressive moving average (ARMA) and autoregressive integrated moving average (ARIMA) have been widely used in solar power forecasting. However, using single linear models may not describe the complexity of solar power variations.

Nonlinear models have received increased attention in time series forecasting. These include traditional neural networks, support vector machines and Gaussian process. These algorithms typically require a larger number of training samples as compared to linear models and thus demand more training time. In addition, they can suffer from overfitting.

Combining multiple models has been shown to improve the performance of each individual model. There are many ways to achieve this and most of them have a linear combination form. Boosting proceeds by fitting the next model on the residual remained from the previous model. Once trained, the weight for each model is fixed. Another approach is to use mixtures of switching mode models. In this case, the weight for each model (mode) is dynamic. This characteristic gives the mixture model more flexibility, but is likely to introduce instability to its performance as we show in our test.

To reduce the variations of solar power, many stationarization algorithms have been proposed as a preprocessing step before forecasting. These algorithms estimate a profile for each day of a year. This profile can come from the clear sky model, from polynomial fitting of multi-year historical data, or from Fourier transforms. Then normalization of a new solar power sequence is done either via division by the profile or via subtraction of the profile. Forecasting is then performed on the normalized data and results are finally transformed back to the original scale. One challenge of this stationarization scheme is the handling of periods near early morning and late afternoon when signal is near zero but has large gradients. This can cause division-by-zero issues for division-based normalization or sharp spikes for subtraction-based normalization, either of which reduces the effectiveness of the stationarization.

SUMMARY

Exemplary embodiments of the disclosure as described herein generally include systems and methods for a mixture of probabilistic principal component analyzers for solar power modeling and forecasting. Embodiments of the disclosure achieve this by a hierarchical breakdown of the complexity of the original signal into different modes and different time stamps such that given a mode at a specific time, the signal can be described nicely by a single probabilistic principal component analyzer (PPCA). This allows solar power to have different modes, e.g., sunny or cloudy modes, at different time stamps, and a mode at a particular time stamp is described by a separate model, a probabilistic principal component analyzer, specialized for that time stamp. Exogenous variables can be easily integrated into a PPCA model according to an embodiment of the disclosure, and such a model can be applied to other time series such as electric load forecasting that also has a fixed set of time stamps.

According to an embodiment of the disclosure, there is provided a method for solar forecasting, including receiving a time series of solar energy data values as a function of time of day at a first time t, forecasting from the solar energy data a mode of day represented by the solar energy data, where the mode of day is one of a sunny day, a cloudy day, or an overcast day, and the forecast predicts the mode of day for a next solar energy datum, receiving the next solar energy datum, and updating a probability distribution function (pdf) of the next solar energy datum given the mode of day, updating a pdf of the mode of day for the next solar energy datum from the updated pdf of the new solar energy datum given the mode of day, forecasting a plurality of future unobserved solar energy data values from the updated pdf of the mode of day, where the plurality of future unobserved solar energy data values $y_t$ and the time series of solar energy data values $x_t$ have a Gaussian distribution for a given mode of day $s_t$=k determined from a set of training data.

According to a further embodiment of the disclosure, the Gaussian distribution for $y_t$ and $x_t$ for a given mode of day $s_t$=k is $P(x_t|s_t=k)=N(z_t|m_{k,t}, C_{k,t})$, where $z_t=[x_t, y_t]$ denotes a combined d-dimensional vector from $x_t$ and $y_t$, where $m_{k,t}$ is the mean and $C_{k,t}$ is the covariance matrix determined by $C_{k,t}=U_{k,t}(\Lambda_{k,t}-\sigma_{k,t}^2 I_q)U'_{k,t}+\sigma_{k,t}^2 I_d$, where $U_{k,t}$ is a d×q matrix whose columns correspond to eigenvectors of a first q principal components determined from the set of training data, $\Lambda_{k,t}$ is a diagonal matrix whose diagonal elements are the q dominant eigenvalues, $\sigma_{k,t}^2$ is a residual eigenvalue or an average of eigenvalues for a remaining (d−q)-dimensional subspace that is orthogonal to the q-dimensional principal eigenspace, and $I_q$ is a q×q identity matrix, and $m_{k,t}$ and $C_{k,t}$ are decomposed into parts corresponding to $x_t$ and $y_t$ such that $m_{k,t}=[m'_{x(k,t)}, m'_{y(k,t)}]'$ and $$C_{k,t} = \begin{bmatrix} C_{xx(k,t)} & C_{xy(k,t)} \\ C_{yx(k,t)} & C_{yy(k,t)} \end{bmatrix},$$

and prime indicates transpose.

According to a further embodiment of the disclosure, determining a mode of day from the solar energy data comprises evaluating a conditional probability $P(s_t|x_{1:t-1})$ of the mode of day $s_t$ for the next solar energy datum given the time series of solar energy data values $x_{1:t-1}$ from a product $P(s_{t-1}|x_{1:t-1})P(s_t|s_{t-1})$, the conditional probability $P(s_t|x)$ is a categorical distribution, $P(s_{t-1}|x_{1:t-1})$ is a conditional probability for a previous solar energy datum at time t−1, and $P(s_t|s_{t-1})$ is a transition probability of a mode of day changing between time t−1 and time t.

According to a further embodiment of the disclosure, the probability distribution function (pdf) $P(x_t|s_t)$ of the new solar energy datum given the mode of day is a multivariate Gaussian distribution, and updating the pdf of the mode of day for the next solar energy datum from the updated pdf of the new solar energy datum given the mode of day comprises evaluating $P(s_t|x_{1:t})$ from $P(s_t|x_{1:t-1})P(x_t|s_t)$.

According to a further embodiment of the disclosure, forecasting a plurality of future unobserved solar energy data values includes evaluating a conditional probability $P(y_t|x_{1:t})$ of plurality of future unobserved solar energy data values given the time series of solar energy data values from $\Sigma_{k=1}^K P(s_t=k|x_{1:t})P(y_t|x_t, s_t=k)$, where $P(s_t=k|x_{1:t})$ is a conditional probability for the mode of day $s_t$ given the time series of solar energy data values $x_{1:t}$, $P(y_t|x_t, s_t=k)$ is a conditional probability of the plurality of future unobserved solar energy data values given the time series of solar energy data values $x_{1:t}$ and the mode of day $s_t$, where $P(y_t|x_t, s_t=k)$ is a Gaussian distribution with a mean $\tilde{m}_{yx(k,t)}=C_{yx(k,t)}C_{xx(k,t)}^{-1}(x_t-m_{x(k,t)})+m_{y(k,t)}$ and covariance $\tilde{C}_{yx(k,t)}=C_{yy(k,t)}-C_{yx(k,t)}C_{xx(k,t)}^{-1}C_{xy(k,t)}$, and the sum is over all modes; and calculating the plurality of future unobserved solar energy data values $\tilde{y}_t$ from $\Sigma_{k=1}^K P(s_t=k|x_{1:t})\tilde{m}_{yx(k,t)}$.

According to a further embodiment of the disclosure, determining the Gaussian distribution for a given mode of day $s_t$=k from a set of training data includes receiving a set of vectors z of solar energy time series for N training days, each with T time stamps, classifying each day into a mode of day, splitting the set of vectors into sub-vectors according to the mode of day, where there is one sub-vector for each mode of day, determining the mean $m_{k,t}$ for each time stamp t from an average over all training days of mode k at time t, for each data point $z_{t,k}$ at a time t in a sub vector for mode k, forming a training set from τ data values that precede $z_{t,k}$ and from τ data values that succeed $z_{t,k}$, training a probabilistic principal component analyzer (PPCA) for each data point from training set for each data point using eigen decomposition to determine matrices $U_{k,t}$ and $\Lambda_{k,t}$, and the residual eigenvalue $\sigma_{k,t}^2$, and initializing a categorical probability for the mode of day and transition probabilities for the mode of day to predetermined values.

According to a further embodiment of the disclosure, classifying each day into a mode of day includes classifying a time series value at time t as noisy of an absolute gradient at time t is greater than a first predetermined threshold, classifying a day as sunny if a percentage of noisy time series values is less than a second predetermined threshold, calculating an upper envelop for all sunny day time series values, defining a template for a cloudy day and a template for an overcast day from the sunny day envelop, matching a non-sunny day time series against each template using an Euclidean distance, and determining whether a non-sunny day is cloudy or overcast based on a smaller corresponding distance.

According to a further embodiment of the disclosure, the mode of day includes a general mode trained on all available data for data values that fall between t modes.

According to a further embodiment of the disclosure, the method includes relearning the mean $m_{k,t}$, the matrices $U_{k,t}$ and $\Lambda_{k,t}$, the residual eigenvalue $\sigma_{k,t}^2$, and the mode of day transition probabilities using an expectation-maximization algorithm.

According to another embodiment of the disclosure, there is provided a method for solar forecasting, including receiving a set of vectors z of solar energy time series for N training days, each with T time stamps, classifying each day into a mode of day represented by the solar energy data, where the mode of day is one of a sunny day, a cloudy day, or an overcast day, splitting the set of vectors into sub-vectors according to the mode of day, where there is one sub-vector for each mode of day, determining a mean $m_{k,t}$ for each time stamp t from an average over all training days of mode k at time t, for each data point $z_{t,k}$ at a time t in a sub vector for mode k, forming a training set from τ data values that precede $z_{t,k}$ and from τ data values that succeed $z_{t,k}$, training a probabilistic principal component analyzer (PPCA) for each data point from training set for each data point using eigen decomposition to determine eigenvector matrix $U_{k,t}$, eigenvalue matrix $\Lambda_{k,t}$, and a residual eigenvalue $\sigma_{k,t}^2$ of a multivariate Gaussian model, where $U_{k,t}$ is a T×q matrix whose columns correspond to eigenvectors of a first q principal components determined from the set of training data, $\Lambda_{k,t}$ is a diagonal matrix whose diagonal elements are the q dominant eigenvalues, $\sigma_{k,t}^2$ is a residual eigenvalue or an average of eigenvalues for a remaining (T−q)-dimensional subspace that is orthogonal to the q-dimensional principal eigenspace, and initializing a categorical probability for the mode of day and transition probabilities for the mode of day to predetermined values.

According to a further embodiment of the disclosure, classifying each day into a mode of day includes classifying a time series value at time t as noisy of an absolute gradient at time t is greater than a first predetermined threshold, classifying a day as sunny if a percentage of noisy time series values is less than a second predetermined threshold, calculating an upper envelop for all sunny day time series values, defining a template for a cloudy day and a template for an overcast day from the sunny day envelop, matching a non-sunny day time series against an Euclidean distance, and determining whether a non-sunny day is cloudy or overcast based on a smaller corresponding distance.

According to a further embodiment of the disclosure, the method includes receiving a time series of solar energy data values as a function of time of day at a first time t, forecasting from the solar energy data a mode of day represented by the solar energy data, where the forecast predicts the mode of day for a next solar energy datum, receiving the next solar energy datum, and updating a probability distribution function (pdf) of the next solar energy datum given the mode of day, updating a pdf of the mode of day for the next solar energy datum from the updated pdf of the new solar energy datum given the mode of day, forecasting a plurality of future unobserved solar energy data values from the updated pdf of the mode of day, where the plurality of future unobserved solar energy data values $y_t$ and the time series of solar energy data values $x_t$ have a Gaussian distribution for a given mode of day $s_t=k$ is $P(z_t|s_t=k)=N(z_t|m_{k,t}, C_{k,t})$, where $z_t=[x_t, y_t]$ denotes a combined d-dimensional vector from $x_t$ and $y_t$, where $m_{k,t}$ is the mean and $C_{k,t}$ is the covariance matrix determined by $C_{k,t}=U_{k,t}(\Lambda_{k,t}-\sigma_{k,t}^2 I_q)U^\prime_{k,t}+\sigma_{k,t}^2 I_d$, where $I_q$ is a q×q identity matrix, and $m_{k,t}$ and $C_{k,t}$ are decomposed into parts corresponding to $x_t$ and $y_t$ such that $m_{k,t}=[m^\prime_{x(k,t)}, m^\prime_{t(k,t)}]^\prime$ and $C_{k,t}=$ $$\begin{bmatrix} C_{xx(k,t)} & C_{xy(k,t)} \\ C_{yx(k,t)} & C_{yy(k,t)} \end{bmatrix},$$

and prime indicates transpose.

According to a further embodiment of the disclosure, determining a mode of day from the solar energy data comprises evaluating a conditional probability $P(s_t|x_{1:t-1})$ of the mode of day $s_t$ for the next solar energy datum given the time series of solar energy data values $x_{1:t-1}$ from a product $P(s_{t-1}|x_{1:t-1})P(s_t|s_{t-1})$, the conditional probability $P(s_t|x)$ is a categorical distribution, $P(s_{t-1}|x_{1:t-1})$ is a conditional probability for a previous solar energy datum at time t−1, and $P(s_t|s_{t-1})$ is a transition probability of a mode of day changing between time t−1 and time t.

According to a further embodiment of the disclosure, the probability distribution function (pdf) $P(x_t|s_t)$ of the new solar energy datum given the mode of day is a multivariate Gaussian distribution, and updating the pdf of the mode of day for the next solar energy datum from the updated pdf of the new solar energy datum given the mode of day comprises evaluating $P(s_t|x_{1:t})$ from $P(s_t|_{1:t-1})P(x_t|s_t)$.

According to a further embodiment of the disclosure, forecasting a plurality of future unobserved solar energy data values includes evaluating a conditional probability $P(y_t|x_{1:t})$ of plurality of future unobserved solar energy data values given the time series of solar energy data values from $\Sigma_{K=1}^{K} P(s_t=k|x_{1:t})P(y_t|x_t, s_t=k)$, where $P(s_t=k|x_{1:t})$ is a conditional probability for the mode of day $s_t$ given the time series of solar energy data values $x_{1:t}$, $P(y_t|x_t, s_t=k)$ is a conditional probability of the plurality of future unobserved solar energy data values given the time series of solar energy data values $x_{1:t}$ and the mode of day $s_t$, where $P(y_t|x_t, s_t=k)$ is a Gaussian distribution with a mean $\tilde{m}_{yx(k,t)}=C_{yx(k,t)}C_{xx(k,t)}^{-1}(x_t-m_{x(k,t)})+m_{y(k,t)}$ and covariance $\tilde{C}_{yx(k,t)}=C_{yy(k,t)}-C_{yx(k,t)}C_{xx(k,t)}^{-1}C_{xy(k,t)}$, and the sum is over all modes, and calculating the plurality of future unobserved solar energy data values $\tilde{y}_t$ from $\Sigma_{k=1}^{K} P(s_t=k|x_{1:t})\tilde{m}_{yx(k,t)}$.

According to another embodiment of the disclosure, there is provided a non-transitory program storage device readable by a computer, tangibly embodying a program of instructions executed by the computer to perform the method steps for solar forecasting.

DETAILED DESCRIPTION OF EXEMPLARY EMBODIMENTS

Figure 1:
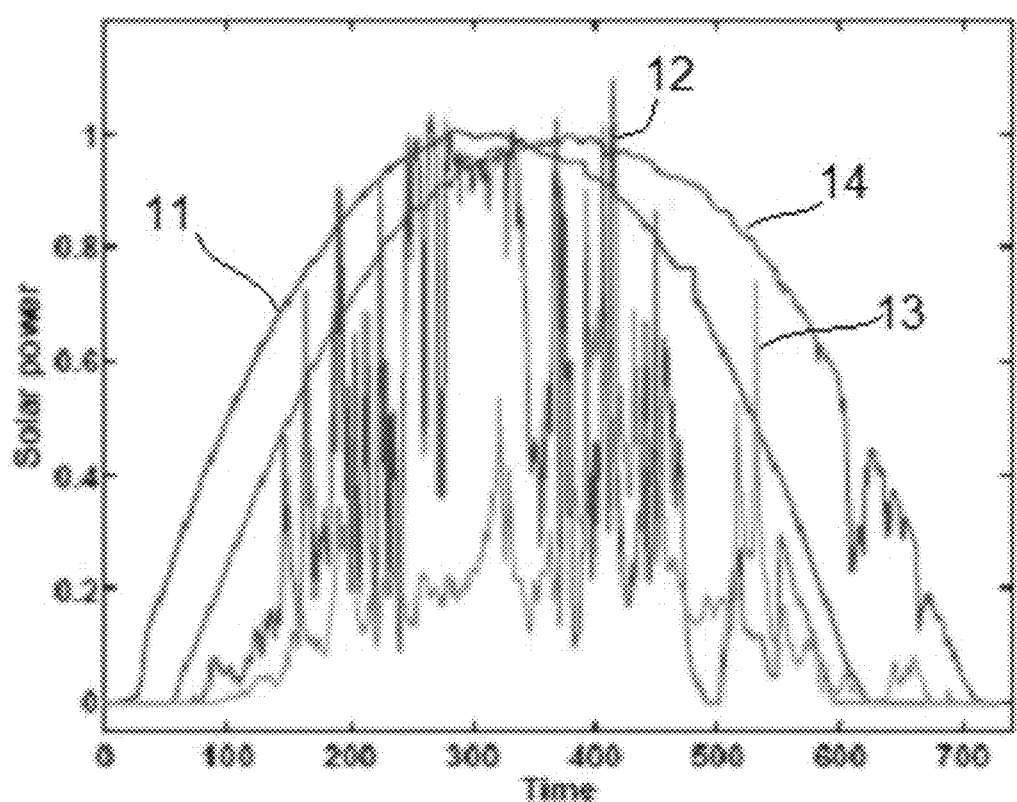
FIG. 1 illustrates examples of solar energy consumption, according to an embodiment of the disclosure

Exemplary embodiments of the disclosure as described herein generally provide systems and methods for solar power forecasting. While embodiments are susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

Embodiments of the disclosure address short-term forecasting based on solar power time series. Such short horizons provide better accuracy than longer terms. An exemplary, non-limiting horizon is up to 15 minutes, however, embodiments of the disclosure are not limited thereto. On the other hand, this short horizon is long enough to start the diesel engine in the case of predicted unavailability of solar power, to avoid power supply interruption. Although we focus on short-term forecasting, the presented methodology is applicable for medium and long terms. Multi-step ahead forecasting can be done recursively, based on one-step ahead forecasting, or directly.

Embodiments of the disclosure use mixture models. These methods share a basic assumption that a complicated time series can be broken down to a small number of modes. Under each mode the signal is simple enough to be handled by one component of the mixture model. One challenge to a mixture model is how to reliably switch to the right mode for a given time stamp.

An exemplary embodiment of the disclosure uses a mixture model that includes multiple probabilistic principal component analyzers (MPPCA) for solar power forecasting.

Each component of a mixture model according to an embodiment of the disclosure is denoted by a pair of indices (k, t), where k indicates a mode (for example, k=1 indicates a sunny mode and k=2 indicate a cloudy mode), and t represents time. If there are a total of K modes and T timestamps, a model according to an embodiment of the disclosure has KT components. According to an embodiment of the disclosure, each component uses a probabilistic principal component analyzer (PPCA). PPCA was originally proposed to model a joint distribution of variables. When used in forecasting, a conditional probability task, PPCA can be viewed as an extension of the autoregressive model. According to an embodiment of the disclosure, MPPCA are used under the framework of Hidden Markov Models (HMM) to add time dependency for neighboring modes.

According to an embodiment of the disclosure, a forecasting task can be formulated as follows. Let $o=\{o_1, o_2, \ldots, o_T\}$ denote the solar power time series for a day. Solar power is non-zero only for a certain period of day. According to an embodiment of the disclosure, solar power is non-zero between 8:00 AM and 8:10 PM, which corresponds to T=730 (minutes), as shown in FIG. 1 and remaining periods are ignored. Let the time be t. Given the past observations, a W-dimensional vector $x_t=[o_{t-W+1}, o_{t-W+2}, \ldots, o_t]'$, the task of forecasting is to predict an H-dimensional future vector $y_t=[o_{t+1}, o_{t+2}, \ldots, o_{t+H}]'$. W represents the window size and H is the maximum horizon of interest. Exemplary, non-limiting vales are W=10 (minutes) and H=15 (minutes), however, embodiments of the disclosure are not limited thereto.

Model Description

Figure 2:
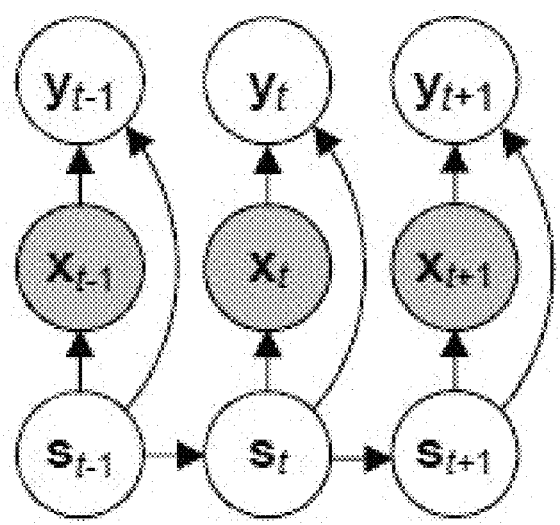
FIG. 2 is graphical representation of mixture of probabilistic principal component analyzers (MPPCA) model according to an embodiment of the disclosure.

FIG. 2 is graphical representation of mixture of probabilistic principal component analyzers (MPPCA) model according to an embodiment of the disclosure. The nodes $x_t$ indicate the past observed values within a window W and nodes $y_t$ represent the future unobserved H values to be predicted. $s_t$ is the hidden mode (state) variable. Given $s_t$, $x_t$ and $y_t$ have a joint Gaussian distribution modeled by probabilistic principal component analyzer (PPCA) according to an embodiment of the disclosure. During forecasting, based on observed $x_t$, the corresponding mode variable $s_t$ is inferred, then, $y_t$ is forecast using the conditional probability of the Gaussian distribution under mode $s_t$. Embodiments of the disclosure assume that $s_t$ follows a Markov chain, so model according to an embodiment of the disclosure can be viewed as an extension of a Hidden Markov Model (HMM).

Let $z_t=[x'_t, y'_t]'$ denote a combined d-dimensional vector from $x_t$ and $y_t$, where d=W+H. Given the mode variable $s_t=k$ at time t, where k=1, 2, . . . , K, embodiments of the disclosure may assume that $z_t$ has a Gaussian distribution $$P(z_t|s_t=k)=N(z_t|m_{k,t},C_{k,t}), \quad (1)$$

where $m_{k,t}$ is the mean and $C_{k,t}$ is the covariance matrix determined by $$C_{k,t}=U_{k,t}(\Lambda_{k,t}-\sigma_{k,t}^2 I_q)U'_{k,t}+\sigma_{k,t}^2 I_d. \quad (2)$$

$U_{k,t}$ is a d×q matrix whose columns correspond to eigenvectors of the first q principal components, and the prime refers to the transpose. $\Lambda_{k,t}$ is a diagonal matrix whose diagonal elements are the q dominant eigenvalues. $\sigma_{k,t}^2$ is the residual eigenvalue or the average of eigenvalues for the remaining (d−q)-dimensional subspace that is orthogonal to the q-dimensional principal eigenspace. $I_q$ is a q×q identity matrix. EQS. (1-3) describe a single PPCA model for component (k, t), according to an embodiment of the disclosure.

According to an embodiment of the disclosure $m_{k,t}$ and $C_{k,t}$ can be decomposed into parts corresponding to $x_t$ and $y_t$ such as $m_{k,t}=[m'_{x(k,t)}, m'_{y(k,t)}]'$ and $$C_{k,t} = \begin{bmatrix} C_{xx(k,t)} & C_{xy(k,t)} \\ C_{yx(k,t)} & C_{yy(k,t)} \end{bmatrix}.$$

Then, given the mode $s_t$ and past observation $x_t$, the conditional probability of $y_t$ is $$P(y_t|x_t, s_t=k)=N(y_t|\tilde{m}_{yx(k,t)}, \tilde{C}_{yx(k,t)}), \quad (3)$$

where $$\tilde{m}_{yx(k,t)}=C_{yx(k,t)}C_{xx(k,t)}^{-1}(x_t-m_{x(k,t)})+m_{y(k,t)}, \quad (4)$$

$$\tilde{C}_{yx(k,t)}=C_{yy(k,t)}-C_{yx(k,t)}C_{xx(k,t)}^{-1}C_{xy(k,t)}. \quad (5)$$

The forecast from a PPCA model is given by the conditional mean $\tilde{m}_{yx(k,t)}$ in EQ. (4). A PPCA model according to an embodiment of the disclosure has a built-in ability to handle singularity: the minor subspace with small or zero eigenvalues is assigned a non-zero residual eigenvalue $\sigma_{k,t}^2$ to guarantee a full rank $C_{xx(k,t)}$.

According to an embodiment of the disclosure, the mode variable $s_t$ is modeled by a Markov chain such that $$P(s_t=j|s_{t-1}=i)=A_{ij}, P(s_1=i)=\pi_i, \quad (6)$$

where A is a K×K matrix whose element $A_{ij}$ indicates the transition probability from mode i to mode j. $\pi=[\pi_1, \pi_2, \ldots, \pi_K]$ indicates the initial probability for mode $s_1$. By introducing this Markov chain, the forecasting results are expected to be more robust against noise, because the determination of mode $s_t$ now depends not only on a new observation $x_t$ but also on previous mode $s_{t-1}$. Note that the initial probability $P(s_1|x_1)$ is a categorical probability that is proportional to $P(s_1)P(x_1|s_1)$, both of which are known after training.

According to an embodiment of the disclosure, there are three modes: a sunny mode, with most sunshine, e.g., curves 11 and 14 in FIG. 1; an overcast mode, with the least sunshine, such as curve 13 in FIG. 1; and a cloudy mode, with medium sunshine, e.g., curve 12 in FIG. 1. In addition to these three modes, according to an embodiment of the disclosure, there is defined a general mode, which is trained on all data available. This general mode helps forecasting patterns that falls between specific modes and cannot be predicted well by either one. Thus, the total number of modes is K=4, which leads to a total of K×T components for an MPPCA model according to an embodiment of the disclosure. An exemplary, non-limiting value of T is 730, so K×T=4×730=2920 components. Note that on the same day, solar power can switch back and forth among all modes.

According to an embodiment of the disclosure, a component (k, t) depends on time t. This strategy is suitable for solar power forecasting, because the set of time stamps is fixed instead of expanding infinitely, such as in a human motion time series.

Training

The parameters of MPPCA model according to an embodiment of the disclosure include two parts. A first part is from the PPCA model for component (k, t), and includes the mean $m_{k,t}$, the eigenvector matrix $U_{k,t}$, the eigenvalue matrix $\Lambda_{k,t}$, and the residual eigenvalue $\sigma_{k,t}^2$, where 1≤k≤K and 0≤t≤T. The second part is for the mode Markov chain that includes the transition probability matrix A and initial probability vector π. An exemplary, non-limiting value of the number of principal components q according to an embodiment of the disclosure can be fixed at 15, but embodiments are not limited thereto. Note that this exemplary values is less than the original exemplary, non-limiting dimension d=W+H=10+15=25. An algorithm according to an embodiment of the disclosure has been found to be insensitive to the value of q within a range between 10 and 20.

Figure 6A:
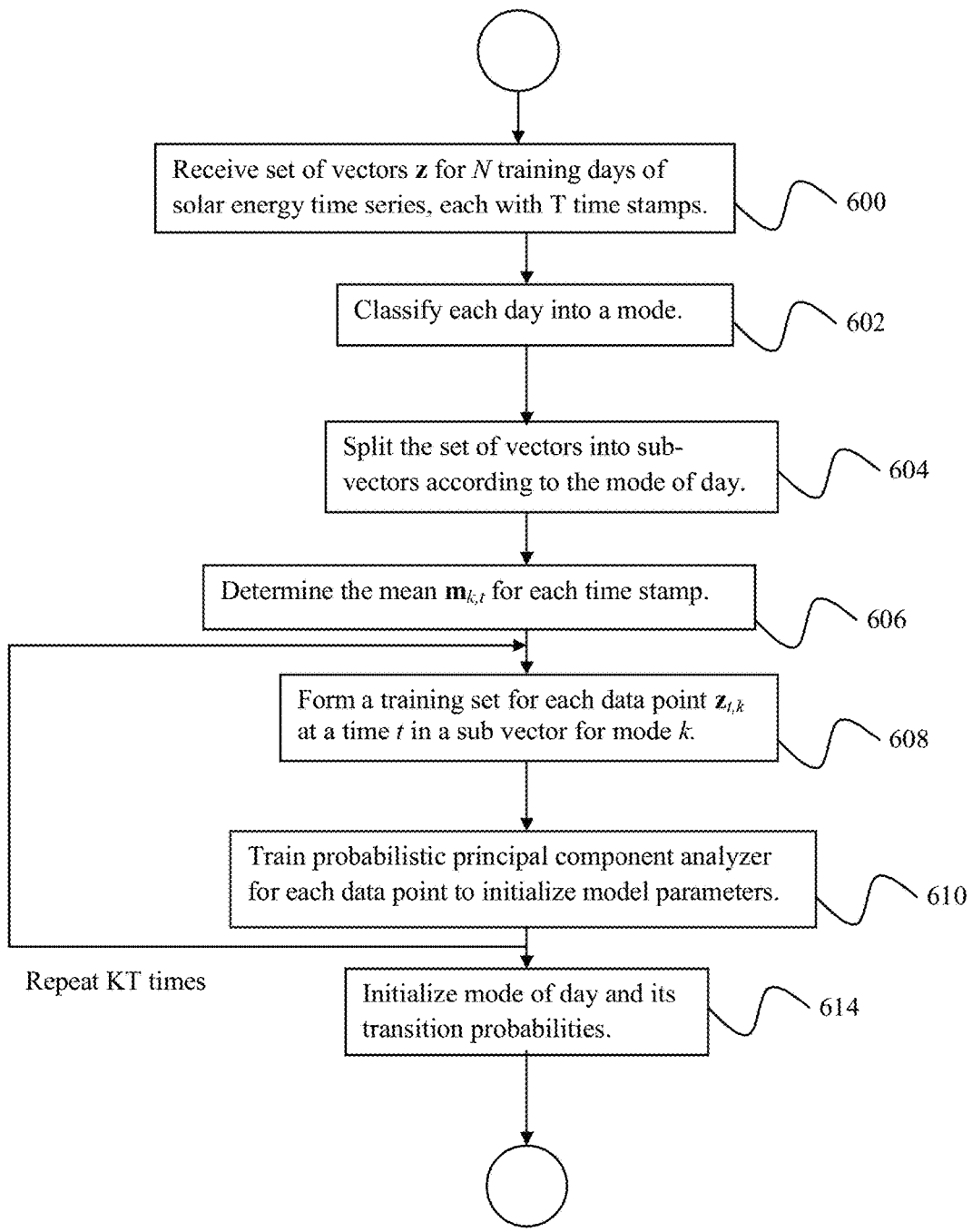
FIGS. 6A-B is a flow chart of a solar power forecasting method according to an embodiment of the disclosure.
Figure 7:
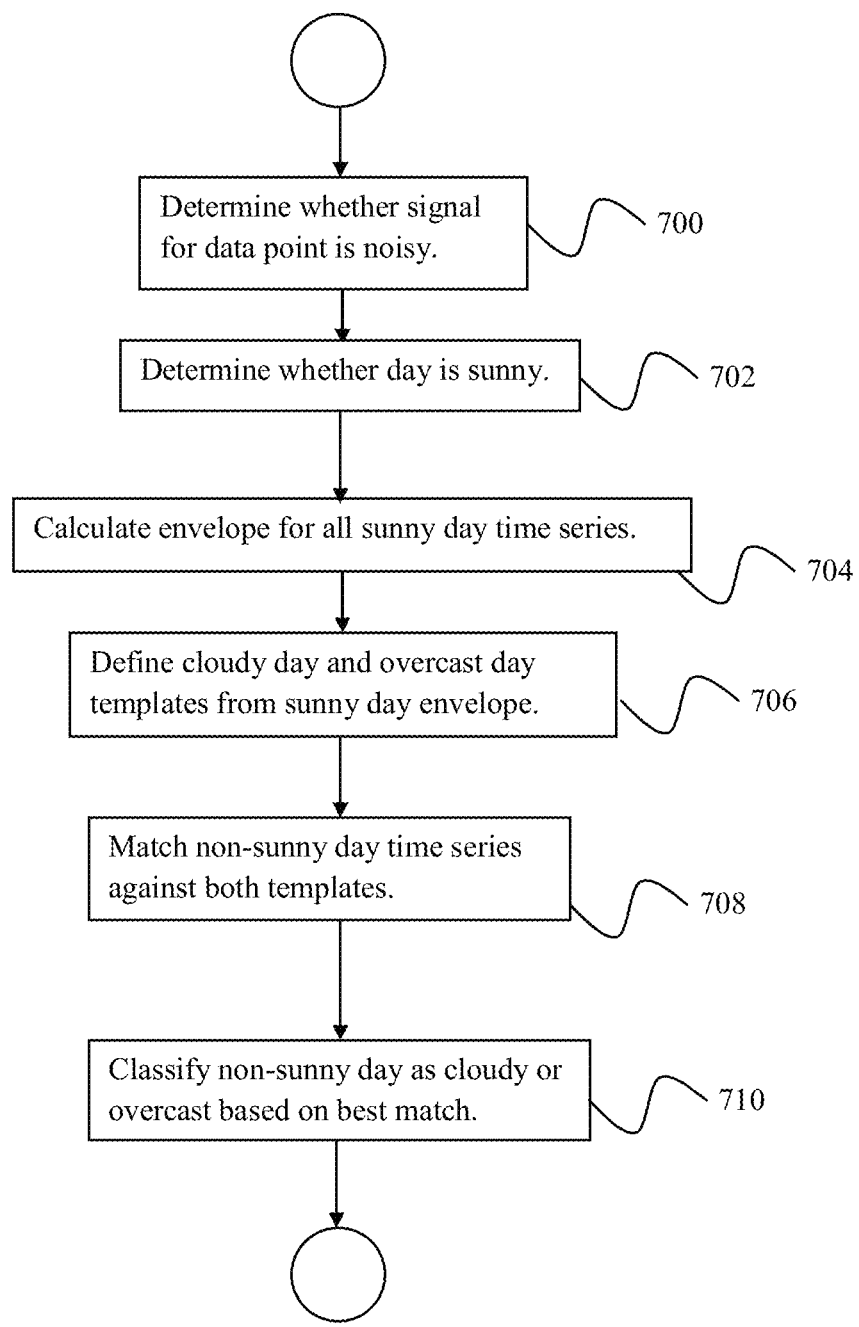
FIG. 7 is a flowchart of a heuristic method of classifying each day into one of the three specific modes according to an embodiment of the disclosure.

FIG. 6A is a flow chart of a method of initializing parameters, according to an embodiment of the disclosure. Referring to the figure, according to an embodiment of the disclosure, initialization of the parameters is as follows. Let there be N training days of solar power time series $o_t^{(n)}$ at step 600, each with T time stamps, where superscript n=1, 2, . . . , N indicates day n. All N time series are vectorized to obtain a large set of training vectors $z_t^{(n)}$, which include past observed values x within window W and H values $y_t^{(n)}$ to be predicted. At step 602, each day may be classified into one of the three specific modes using the following heuristics. These heuristics are exemplary and non-limiting, and embodiments of the disclosure are not limited thereto. FIG. 7 is a flow chart of this heuristic method. Referring now to FIG. 7, if, at step 700, the absolute gradient of the signal at time t is larger than a first threshold, this time stamp is noisy. An exemplary, non-limiting value for the first threshold is 0.02. If, at step 702, the percentage of noisy time stamps is less than a second threshold, this day is classified as a sunny day. An exemplary, non-limiting value for the second threshold is 0.02. This strategy is based on the fact that solar power is mostly smooth on a sunny day. If a day doesn't meet the above criterion, it belongs to one of the remaining two types of specific days. Then, at step 704, an upper envelop f of all sunny day sequences obtained above may be computed. For example, in FIG. 1, f will include curve 11 between t=1 and t=350, and then curve 14 between t=351 and t=730. At step 706, templates for a cloudy day and an overcast day are defined from the sunny day envelop. The templates for a cloudy day and overcast day may be specified by third and fourth thresholds, respectively. Exemplary, non-limiting values for the third and fourth threshold are 0.5f and 0.2f, respectively. At step 708, a non-sunny day time series is matched against both templates via Euclidean distance and the day is classified to the day type at step 710 based on whose corresponding distance is smaller.

Referring again to FIG. 6A, to learn the PPCA for component (k, t), all $z_t^{(n)}$ whose day type is classified as k as above are used. Thus, at step 604, the vectorized set of training vectors $z_t^{(n)}$ is split into sub-vectors according to the mode of day, where there is one sub-vector for each mode of day. There will be about N/3 such vectors for each day type on average. The mean $m_{k,t}$ for each component can be calculated at step 606 from an average over all training days of mode k at time t. According to an embodiment of the disclosure, at step 608, using the fact that neighboring signals are usually similar, the training set may be formed for component (k, t) to include all vectors between t−τ and t+τ, still with the same day type k. An exemplary, non-limiting value for τ is 50. A PPCA model according to an embodiment of the disclosure may be trained at step 610 using eigen decomposition of the matrix formed from the training sets. For a general mode that doesn't have a day type, the corresponding PPCA can be trained using all $z_t^{(n)}$, still between t−τ and t+τ, regardless of the day type. The above learning is repeated KT times, to yield values for the eigenvector matrix $U_{k,t}$, the eigenvalue matrix $\Lambda_{k,t}$, and the residual eigenvalue $\sigma_{k,t}^2$. The initialization for the Markov chain is accomplished at step 614 by setting $A_{ij}$=0.91 for i=j, $A_{ij}$=0.03 for i≠j to encourage a within-mode transition, and $\pi_i$=0.25, where 1≤i, j≤K=4. These initializations for $A_{ij}$ and $\pi_i$ are exemplary and non-limiting, and embodiments are not limited thereto.

According to an embodiment of the disclosure, an EM algorithm is used, at step 614 to re-learn all parameters recursively after the initialization. Note that in the initialization, each vector $z_t^{(n)}$ is assigned to a mode k by a hard decision with a probability of either 0 or 1. In contrast, during the EM iteration, such decision becomes soft: $z_t^{(n)}$ is assigned to mode k with a probability between 0 and 1. Using soft decision helps to reduce errors due to bias and noise that may be introduced by a preliminary initialization method.

Forecasting

Figure 6B:
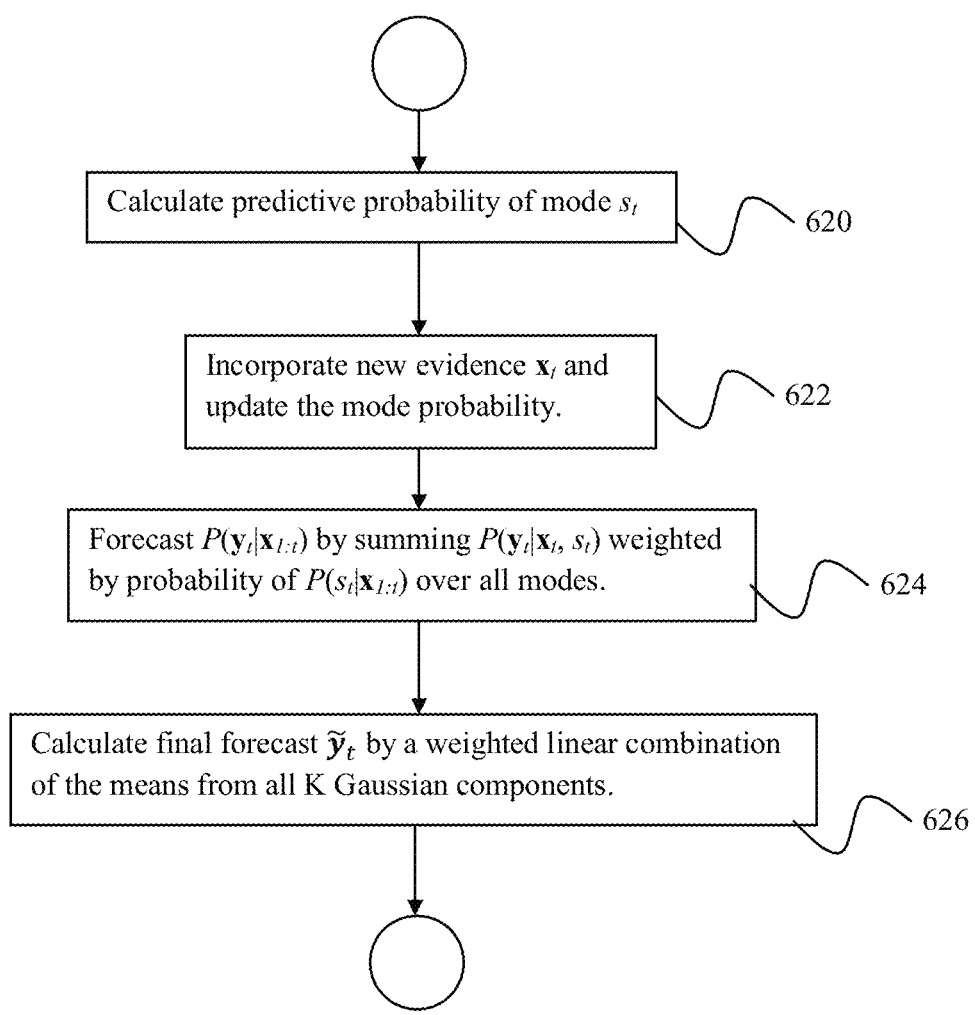

According to an embodiment of the disclosure, an objective of forecasting at time t is to compute the conditional probability of $P(y_t|x_{1:t})$ based on all the past observations $x_1$ to $x_t$. This is a recursive process that includes the following steps. A flowchart of a forecasting method according to an embodiment of the disclosure is presented in FIG. 6B, and the following step numbers refer to FIG. 6B.

Step 620: mode prediction. Suppose that there are $P(s_{t-1}|x_{1:t-1})$ from last time stamp t−1. The first step is to forecast the mode $s_t$ or calculate its predictive probability $P(s_t|x_{1:t-1})$:

$$P(s_t|x_{1:t-1}) \propto P(s_{t-1}|x_{1:t-1})P(s_t|s_{t-1}). \qquad (7)$$

Step 622: mode update. This step can incorporate new evidence $x_t$ by evaluating $P(x_t|s_t=k)=N(x_t|m_{x(k,t)}, C_{xx(k,t)})$ and then updating the mode probability from step 1 by computing $P(s_t|x_{1:t})$:

$$P(s_t|x_{1:t}) \propto P(s_t|x_{1:t-1})P(x_t|s_t). \qquad (8)$$

Step 624: forecasting. This step forecasts $P(y_t|x_{1:t})$, which is a mixture of K=4 Gaussian components; each Gaussian component has a distribution $P(y_t|x_t, s_t)$ with a probability of $P(s_t|x_{1:t})$:

$$P(y_t|x_{1:t}) = \Sigma_{k=1}^{K} P(s_t=k|x_{1:t})P(y_t|x_t, s_t=k). \qquad (9)$$

Step 626: The final forecast $\tilde{y}_t$ is a weighted linear combination of the means from all K Gaussian components:

$$\tilde{y}_t = \Sigma_{k=1}^{K} P(s_t=k|x_{1:t})\tilde{m}_{yx(k,t)}. \qquad (10)$$

Figure 3:
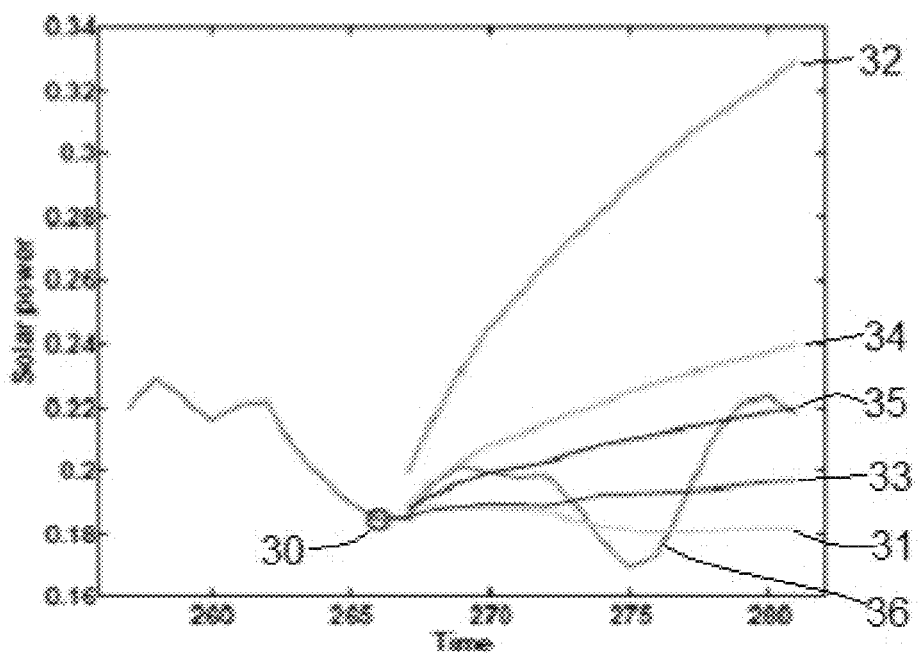
FIG. 3 shows an example of how an MPPCA forecasting according to an embodiment of the disclosure is performed at time t, according to an embodiment of the disclosure.

FIG. 3 shows an example of how an MPPCA forecasting according to an embodiment of the disclosure is performed at time t. Suppose the current time is t=266 (marked by a circle 30) and it is observed that the latest $x_t$ is between t=257 and t=266. The task of forecasting is to predict $y_t$ between t=267 and t=281. After the aforementioned forecasting steps, the corresponding means $\tilde{m}_{yx(k,t)}$ of $P(y_t|x_t, s_t=k)$ for all four modes are indicated by 31 (sunny mode), 32 (cloudy mode), 33 (overcast mode) and 34 (general mode), respectively. The corresponding probabilities $P(s_t|x_{1:t})$ for all four modes are 0.022 (sunny), 0.071 (cloudy), 0.579 (overcast) and 0.328 (general), respectively. The final forecasting $\tilde{y}_t$ is represented by the black curve 35, which is a linear combination of curves from all four modes weighted by their corresponding probabilities. For comparison purposes, the original signal 36 is shown between t=267 and t=281, and it is not used by a forecasting algorithm according to an embodiment of the disclosure. As shown in this case, a prediction of a forecasting algorithm according to an embodiment of the disclosure is more accurate at small horizons and also at large horizons, but is not accurate in the middle, e.g., at t=275. Note that the above results are only for this particular case, and for other time stamps on the same day, totally different mode probabilities and results can be expected.

This case shows an overcast period because at this late morning time, solar power is still very low at around 0.2 vs. the maximum value of about 1.0. An MPPCA model according to an embodiment of the disclosure correctly detects this by giving the overcast mode the highest probability at 0.579. The general mode, which is close to an overcast mode, is correctly given the second highest probability. The other modes have little impact on the forecasting because of their low probabilities. It is worth noting that if a wrong mode, e.g., a cloudy mode in this case, is mistakenly given a large probability, the forecasting error can be very high.

According to an embodiment of the disclosure, another way to update the mode probability is by evaluating the previous forecasting results based on a recently received ground truth. Specifically, the first two steps above will be replaced as follows. First, mode update is performed by $$P(s_{t-H}|x_{1:t}) \propto (P(s_{t-h}|x_{1:t-H})P(y_{t-H}|x_{1:t-H}, s_{t-H}) \quad (11)$$

Second, mode prediction is given by a new $$P(s_t|x_{1:t}) \propto (P(s_{t-H}|x_{1:t})P(s_t|s_{t-H}) \quad (12)$$

Note that the conditional distribution of $P(y_{t-H}|x_{1:t-H}, s_{t-H})$ is obtained H minutes ago. But not until now at time t, is there a ground truth $y_{t-H}=[o_{t-H+1}, o_{t-H+2}, \ldots, o_t]'$ to judge its goodness. This strategy is mostly applied for one-step ahead forecasting, with a horizon H=1. For a longer horizon, the information delay can cause performance degradation. Furthermore, it is possible for an incorrect mode to provide good forecasting for some time stamps and get a high probability. For example in FIG. 3, using this strategy, the sunny mode would get the high probability around t=275 because it predicts nearby $o_t$ nicely. However, such good performance is not consistent and the incorrect mode is likely to give poor results for other time stamps.

Test Results

According to an embodiment of the disclosure, a 194-day data set from a solar power plant is used for evaluation. The data has a resolution of one minute and covers time between June, 2008 and December, 2008. One minute is perhaps the highest resolution seen in the literature. Most existing approaches use data with a resolution between five minutes and one hour.

As noted earlier, only the period between 8:00 AM and 8:10 PM is used, as solar power is mostly zero in other periods. Missing values are common and are interpolated such that each day has a complete time series with T=730 valid data points. The maximum value of the original time series is close to 10000 mw. All time series values are divided by 8000 so the maximum value after this normalization is about 1.2. All tests and scores are conducted on this normalized data set.

According to embodiments of the disclosure, the following algorithms are compared. To ensure a fair comparison, they all use the same $x_t$ representing the past W=10 observations as inputs, and output the next H=15 forecasts. No additional preprocessing, such as stationarization or low-pass filtering, is performed for the algorithms.

Gaussian process (GP): GP represents one of state-of-the-art nonlinear models. However, it demands a high training complexity proportional to the cubic of the number of training samples. According to an embodiment of the disclosure, this number is about (730−25+1)×194×0.9=123267, which is prohibitive for training a standard GP. Therefore, a sparse GP technique was used. Instead of learning pseudo inputs as parameters, k-mean was applied to find 2000 pseudo inputs. The inputs are fixed during parameter learning. GP learns a single model for each horizon, independently.

Autoregressive (AR): The AR(10) model is essentially a linear regression with W=10 linear coefficients. These coefficients are learned by a least squares method. Conceptually, ARIMA should be used to handle nonstationary time series. However, when applied to solar forecasting, ARIMA usually needs very low orders. By ignoring the moving average part, such ARIMA can be explicitly written in a form of AR(2), and thus covered by this more flexible AR(10) model. This algorithm learns a single model for each horizon, independently.

Probabilistic principal component analyzer (PPCA): This model learns a single model for all horizons simultaneously. Mixture of autoregressive models (Mix AR): This method employs a mixture of AR(10) models for each horizon. It uses the same four modes as a method according to an embodiment of the disclosure and thus the total number of mixture components is four. The same initialization as described above is used and the model is learned by an EM algorithm. Mode update is performed by evaluating the previous forecasts.

A Mixture of PPCA (MPPCA) according an embodiment of the disclosure: In summary, a model according an embodiment of the disclosure has four modes and a total number of K×T=4×730=2920 mixture components.

According to an embodiment of the disclosure, a ten-fold cross validation is used. 194 days were randomly into ten similarly sized subsets (folds). For each run, one fold was used as a test set and the other nine folds as training set. A trained algorithm is applied to the test set and root mean squared error (RMSE) is computed as $$RMSE = \sqrt{\frac{\sum_{i=1}^{L}(forecast_i - truth_i)^2}{L}}.$$

This process is repeated ten times.

Figure 4:
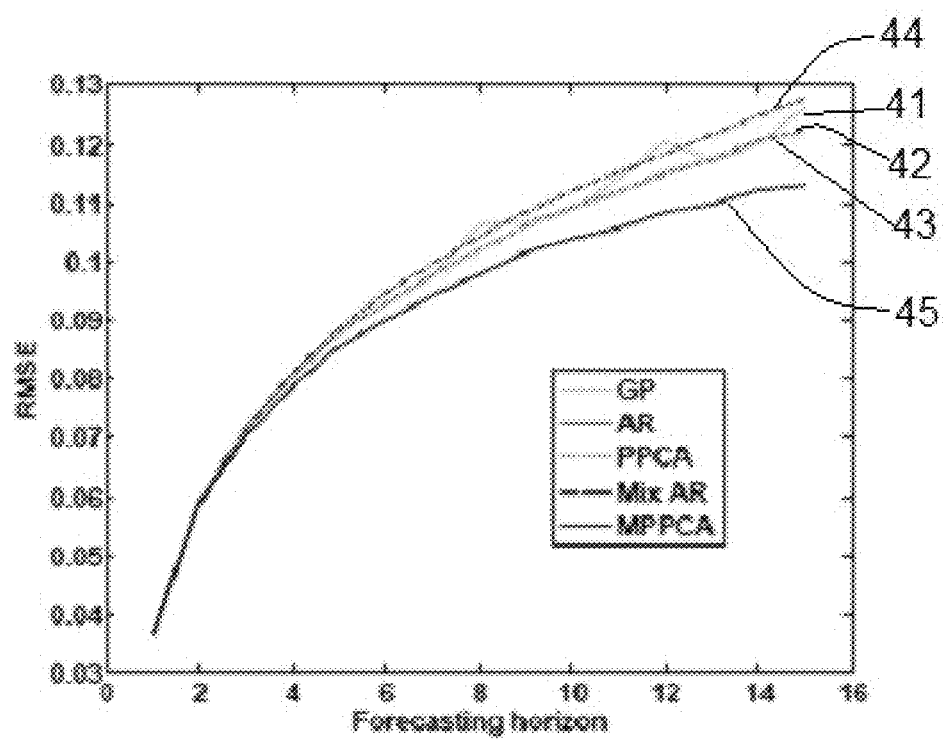
FIG. 4 shows the average RMSE for several algorithms and for different forecasting horizons, according to an embodiment of the disclosure.

FIG. 4 shows the average RMSE for the GP 41, AR 42, PPCA 43, Mix AR algorithms 44, and an MPPCA algorithm 45 according to an embodiment of the disclosure, respectively, and for different forecasting horizon (h=1, 2, . . . , H=15). In general, all algorithms perform comparably well at small horizons, but the performances start to diverge after h=5. An algorithm according to an embodiment of the disclosure produced the lowest average RMSEs for all horizons followed by the PPCA and AR algorithms which perform very similarly. To avoid cluttering the chart, error bars are not shown. However, based on the one-sided paired t-test with a confidence level at 0.05, results for an algorithm according to an embodiment of the disclosure are better than all others. For example, for the t-test against AR, the p-value is 0.022 for a horizon of 1, decreases to 0.001 for a horizon of 5 and reaches 0.00004 for a horizon of 15.

The single AR model performs well in this case, even if the time series are not stationarized. This suggests that least square-based AR model, if given high enough order, can model non-stationarity to some extent. Surprisingly, the mixture of AR models performs worse than the single AR. This can be attributed to the mode probability updating mechanism. The mixture of AR models assesses a mode based on the conditional probability from the previous forecasting. This seems to less reliable than using the marginal probability of observations, as used by an MPPCA according to an embodiment of the disclosure.

The GP algorithm appears to have an overfitting issue, because sometimes it is as good as an AR model but sometimes, especially for larger horizons, it performs noticeably worse. Similar behaviors are also observed in a neural network. It may be that sophisticated nonlinear models should be very competitive for stationary time series, but may be sub-optimal choices for directly modeling a non-stationary time series such as solar power due to the wide range of value changes at different time stamps.

Figure 5:
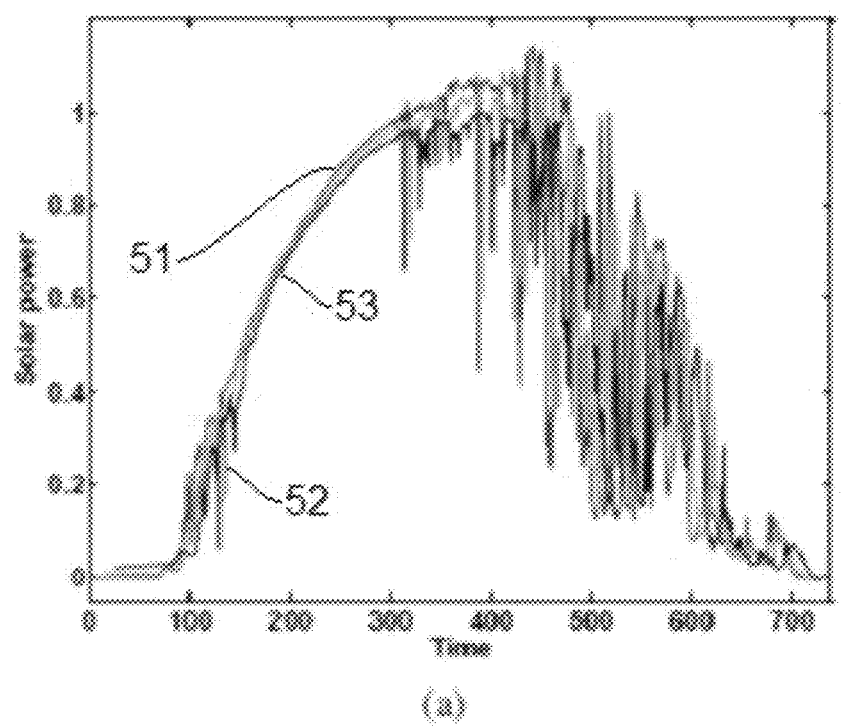
FIGS. 5(a)-(b) illustrate two examples of how forecasting results of a model according to an embodiment of the disclosure compare with the original signals for two different horizons.
Figure 5:
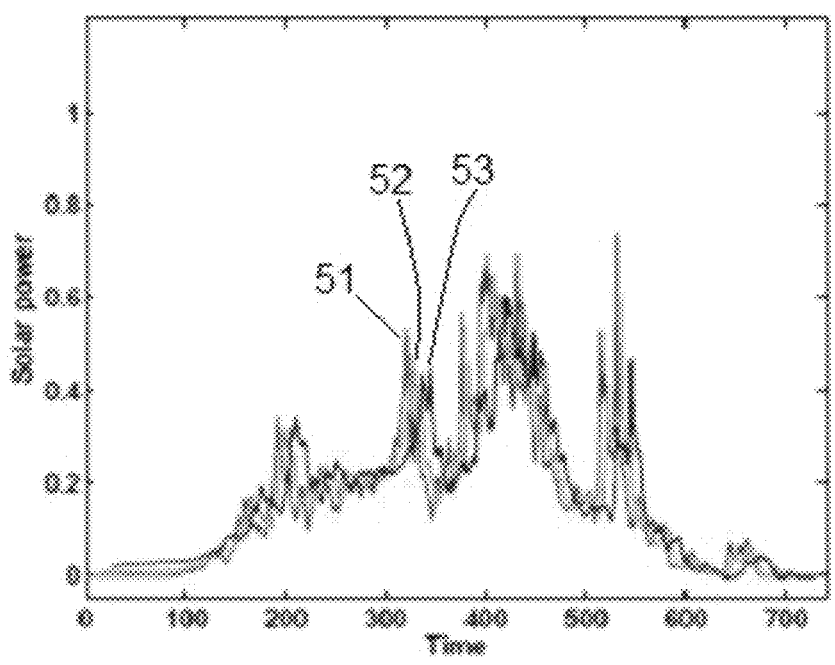

FIGS. 5(a)-(b) illustrate two examples of how forecasting results of a model according to an embodiment of the disclosure compare with the original signals for two different horizons, h=5 and h=15 minutes. Each figure shows the original signal 51, the 5-minute forecast 52, and the 15 minute forecast 53. Two examples are shown: FIG. 5(a) depicts a sunny morning followed by a cloudy afternoon; and FIG. 5(b) depicts a mostly overcast day. Note that each forecast point is obtained h minutes earlier, but is plotted h minutes ahead to be compared with the ground truth at that future time. In general, a larger horizon has more uncertainty and thus can cause higher forecasting errors.

System Implementations

It is to be understood that embodiments of the present disclosure can be implemented in various forms of hardware, software, firmware, special purpose processes, or a combination thereof. In one embodiment, the present disclosure can be implemented in software as an application program tangible embodied on a computer readable program storage device. The application program can be uploaded to, and executed by, a machine comprising any suitable architecture.

Figure 8:
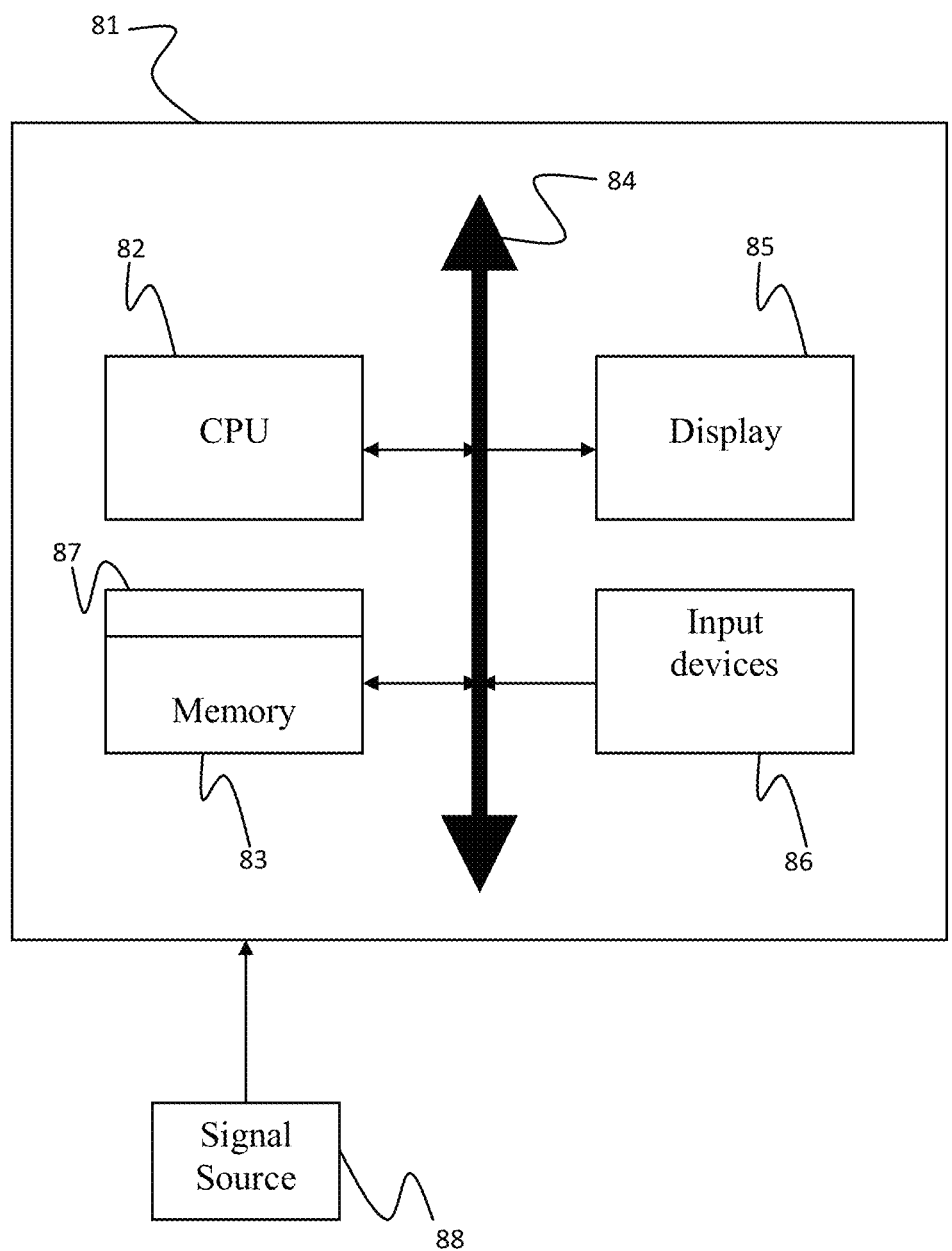
FIG. 8 is a block diagram of a system for solar power forecasting according to an embodiment of the disclosure.

FIG. 8 is a block diagram of an exemplary computer system for implementing a method for solar power forecasting according to an embodiment of the disclosure. Referring now to FIG. 8, a computer system 81 for implementing an embodiment of the present disclosure can comprise, inter alia, a central processing unit (CPU) 82, a memory 83 and an input/output (I/O) interface 84. The computer system 81 is generally coupled through the I/O interface 84 to a display 85 and various input devices 86 such as a mouse and a keyboard. The support circuits can include circuits such as cache, power supplies, clock circuits, and a communication bus. The memory 83 can include random access memory (RAM), read only memory (ROM), disk drive, tape drive, etc., or a combinations thereof. The present disclosure can be implemented as a routine 87 that is stored in memory 83 and executed by the CPU 82 to process the signal from the signal source 88. As such, the computer system 81 is a general purpose computer system that becomes a specific purpose computer system when executing the routine 87 of the present disclosure.

The computer system 81 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present disclosure is programmed.

Given the teachings of the present disclosure provided herein, one of ordinary skill in the related art will be able to contemplate these and similar implementations or configurations of the present disclosure.

While embodiments of the present disclosure has been described in detail with reference to exemplary embodiments, those skilled in the art will appreciate that various modifications and substitutions can be made thereto without departing from the spirit and scope of the embodiments of the disclosure as set forth in the appended claims.

What is claimed is:

1. A method for solar forecasting for managing a power grid, comprising the steps of:
receiving a time series of solar energy data values as a function of time of day at a first time t;
forecasting from the solar energy data a mode of day represented by the solar energy data, wherein the mode of day is one of a sunny day, a cloudy day, or an overcast day, and the forecast predicts the mode of day for a next solar energy datum;
receiving a new solar energy datum corresponding to the next solar energy datum, and updating a probability distribution function (pdf) of the new solar energy datum given the mode of day;
updating a pdf of the mode of day for the next solar energy datum from the updated pdf of the new solar energy datum given the mode of day;
forecasting a plurality of future unobserved solar energy data values from the updated pdf of the mode of day, wherein the plurality of future unobserved solar energy data values $y_t$ and the time series of solar energy data values $x_t$ have a Gaussian distribution for a given mode of day $s_t=k$ determined from a set of training data.

2. The method of claim 1, wherein the Gaussian distribution for $y_t$ and $x_t$ for a given mode of day $s_t=k$ is $P(z_t|s_t=k)=N(z_t|m_{k,t}, C_{k,t})$, wherein $z_t=[x_t, y_t]$ denotes a combined d-dimensional vector from $x_t$ and $y_t$,
where $m_{k,t}$ is a mean and $C_{k,t}$ is a covariance matrix determined by $$C_{k,t}=U_{k,t}(\Lambda_{k,t}-\sigma_{k,t}^2 I_q)U'_{k,t}+\sigma_{k,t}^2 I_d,$$

wherein $U_{k,t}$ is a d×q matrix whose columns correspond to eigenvectors of a first q principal components determined from the set of training data, $\Lambda_{k,t}$ is a diagonal matrix whose diagonal elements are the q dominant eigenvalues, $\sigma_{k,t}^2$ is a residual eigenvalue or an average of eigenvalues for a remaining (d−q)-dimensional subspace that is orthogonal to the q-dimensional principal eigenspace, and $I_q$ is a q×q identity matrix, and $m_{k,t}$ and $C_{k,t}$ are decomposed into parts corresponding to $x_t$ and $y_t$ such that $m_{k,t}=[m'_{x(k,t)}, m'_{y(k,t)}]'$ and $$C_{k,t}=\begin{bmatrix} C_{xx(k,t)} & C_{xy(k,t)} \\ C_{yx(k,t)} & C_{yy(k,t)} \end{bmatrix},$$

and prime indicates transpose.

3. The method of claim 2, wherein forecasting a plurality of future unobserved solar energy data values comprises:
evaluating a conditional probability $P(y_t|x_{1:t})$ of the plurality of future unobserved solar energy data values given the time series of solar energy data values from $\Sigma_{k=1}^{K} P(s_t=k|x_{1:t})P(y_t|x_t, s_t=k)$, wherein $P(s_t=k|x_{1:t})$ is a conditional probability for the mode of day $s_t$ given the time series of solar energy data values $x_{1:t}$, $P(y_t|x_t, s_t=k)$ is a conditional probability of the plurality of future unobserved solar energy data values given the time series of solar energy data values $x_{1:t}$ and the mode of day $s_t$, wherein $P(y_t|x_t, s_t=k)$ is a Gaussian distribution with a mean $\tilde{m}_{yx(k,t)}=C_{yx(k,t)}C_{xx(k,t)}^{-1}(x_t-m_{x(k,t)})+m_{y(k,t)}$ and covariance $\tilde{C}_{yx(k,t)}=C_{yy(k,t)}-C_{yx(k,t)}C_{xx(k,t)}^{-1}C_{xy(k,t)}$, and the sum is over all modes; and calculating the plurality of future unobserved solar energy data values $\tilde{y}_t$ from $\Sigma_{k=1}^{K}P(s_t=k|x_{1:t})\tilde{m}_{yx(k,t)}$.

4. The method of claim 2, wherein determining the Gaussian distribution for a given mode of day $s_t=k$ from a set of training data comprises:

receiving a set of vectors z of solar energy time series for N training days, each with T time stamps;

classifying each day into a mode of day;

splitting the set of vectors into sub-vectors according to the mode of day, wherein there is one sub-vector for each mode of day;

determining the mean $m_{k,t}$ for each time stamp t from an average over all training days of mode k at time t;

for each data point $z_{t,k}$ at a time t in a sub vector for mode k, forming a training set from τ data values that precede $z_{t,k}$ and from τ data values that succeed $z_{t,k}$;

training a probabilistic principal component analyzer (PPCA) for each data point from the training set for each data point using eigen decomposition to determine matrices $U_{k,t}$ and $\Lambda_{k,t}$, and a residual eigenvalue $\sigma_{k,t}^2$; and initializing a categorical probability for the mode of day and a transition probability for the mode of day to predetermined values.

5. The method of claim 4, wherein classifying each day into a mode of day comprises:

classifying a time series value at time t as noisy if an absolute gradient at time t is greater than a first predetermined threshold;

classifying a day as sunny if a percentage of noisy time series values is less than a second predetermined threshold;

calculating an upper envelop for all sunny day time series values;

defining a template for a cloudy day and a template for an overcast day from the sunny day envelop;

matching a non-sunny day time series against each template using an Euclidean distance; and determining whether a non-sunny day is cloudy or overcast based on a smaller corresponding distance.

6. The method of claim 5, wherein the mode of day includes a general mode trained on all available data for data values that fall between two modes.

7. The method of claim 4, further comprising relearning the mean $m_{k,t}$, the matrices $U_{k,t}$ and $\Lambda_{k,t}$, the residual eigenvalue $\sigma_{k,t}^2$, and the transition probability for the mode of day using an expectation-maximization algorithm.

8. The method of claim 1, wherein determining a mode of day from the solar energy data comprises evaluating a first conditional probability $P(s_t|X_{1:t-1})$ of the mode of day $s_t$ for the next solar energy datum given the time series of solar energy data values $x_{1:t-1}$ from a product $P(s_{t-1}|x_{1:t-1})P(s_t|s_{t-1})$, a second conditional probability $P(s_t|x)$ is a categorical distribution, $P(s_{t-1}|x_{1:t-1})$ is a third conditional probability for a previous solar energy datum at time t−1, and $P(s_t|s_{t-1})$ is a transition probability of a mode of day changing between time t−1 and time t.

9. The method of claim 1, wherein the probability distribution function (pdf) $P(x_t|s_t)$ of the new solar energy datum given the mode of day is a multivariate Gaussian distribution, and updating the pdf of the mode of day for the next solar energy datum from the updated pdf of the new solar energy datum given the mode of day comprises evaluating $P(s_t|x_{1:t})$ from $P(s_t|x_{1:t-1})P(x_t|s_t)$.

10. A method for solar forecasting in order to manage a power grid, comprising the steps of:

receiving a set of vectors z of a solar energy time series for N training days, each with T time stamps;

classifying each day into a mode of day represented by the solar energy time series, wherein the mode of day is one of a sunny day, a cloudy day, or an overcast day;

splitting the set of vectors into sub-vectors according to the mode of day, wherein there is one sub-vector for each mode of day;

determining a mean $m_{k,t}$ for each time stamp t from an average over all training days of mode k at time t;

for each data point $z_{t,k}$ at a time t in a sub vector for mode k, forming a training set from τ data values that precede $z_{t,k}$ and from τ data values that succeed $z_{t,k}$;

training a probabilistic principal component analyzer (PPCA) for each data point from the training set for each data point using eigen decomposition to determine eigenvector matrix $U_{k,t}$, eigenvalue matrix $\Lambda_{k,t}$, and a residual eigenvalue $\sigma_{k,t}^2$ of a multivariate Gaussian model, wherein $U_{k,t}$ is a T×q matrix whose columns correspond to eigenvectors of a first q principal components determined from the set of training data, $\Lambda_{k,t}$ is a diagonal matrix whose diagonal elements are the q dominant eigenvalues, $\sigma_{k,t}^2$ is a residual eigenvalue or an average of eigenvalues for a remaining (T−q)-dimensional subspace that is orthogonal to the q-dimensional principal eigenspace; and initializing a categorical probability for the mode of day and transition probabilities for the mode of day to predetermined values, receiving a time series of solar energy data values as a function of time of day at a first time t;

forecasting from the solar energy data a mode of day represented by the solar energy data, wherein the forecast predicts the mode of day for a next solar energy datum;

receiving a new solar energy datum corresponding to the next solar energy datum, and updating a probability distribution function (pdf) of the new solar energy datum given the mode of day;

updating a pdf of the mode of day for the next solar energy datum from the updated pdf of the new solar energy datum given the mode of day;

forecasting a plurality of future unobserved solar energy data values from the updated pdf of the mode of day, wherein the plurality of future unobserved solar energy data values $y_t$ and the time series of solar energy data values $x_t$ have a Gaussian distribution for a given mode of day $s_t=k$ is $P(z_t|s_t=k)=N(z_t|m_{k,t},C_{k,t})$, wherein $z_t=[x_t, y_t]$ denotes a combined d-dimensional vector from $x_t$ and $y_t$, where $m_{k,t}$ is the mean and $C_{k,t}$ is the covariance matrix determined by $$C_{k,t}=U_{k,t}(\Lambda_{k,t}-\sigma_{k,t}^2 I_q)U'_{k,t}+\sigma_{k,t}^2 I_d,$$

wherein $I_q$ is a q×q identity matrix, and $m_{k,t}$ and $C_{k,t}$ are decomposed into parts corresponding to $x_t$ and $y_t$ such that $m_{k,t}=[m'_{x(k,t)}, m'_{y(k,t)}]'$ and $$C_{k,t} = \begin{bmatrix} C_{xx(k,t)} & C_{xy(k,t)} \\ C_{yx(k,t)} & C_{yy(k,t)} \end{bmatrix},$$

and prime indicates transpose.

11. The method of claim 10, wherein classifying each day into a mode of day comprises:
classifying a time series value of the solar energy time series at time t as noisy if an absolute gradient at time t is greater than a first predetermined threshold;
classifying a day as sunny if a percentage of noisy time series values is less than a second predetermined threshold;
calculating an upper envelop for all sunny day time series values;
defining a template for a cloudy day and a template for an overcast day from the sunny day envelop;
matching a non-sunny day time series against each template using an Euclidean distance; and
determining whether a non-sunny day is cloudy or overcast based on a smaller corresponding distance.

12. The method of claim 10, wherein determining a mode of day from the solar energy data comprises evaluating a first conditional probability $P(s_t|x_{1:t-1})$ of the mode of day $s_t$ for the next solar energy datum given the time series of solar energy data values $x_{1:t-1}$ from a product $P(s_{t-1}|x_{1:t-1})P(s_t|s_{t-1})$, a second conditional probability $P(s_t|x)$ is a categorical distribution, $P(S_{t-1}|x_{1:t-1})$ is a third conditional probability for a previous solar energy datum at time t−1, and $P(s_t|s_{t-1})$ is a transition probability of a mode of day changing between time t−1 and time t.

13. The method of claim 10, wherein the probability distribution function (pdf) $P(x_t|s_t)$ of the new solar energy datum given the mode of day is a multivariate Gaussian distribution, and updating the pdf of the mode of day for the next solar energy datum from the updated pdf of the new solar energy datum given the mode of day comprises evaluating $P(s_t|x_{1:t})$ from $P(s_t|x_{1:t-1})P(x_t|s_t)$.

14. The method of claim 10, wherein forecasting a plurality of future unobserved solar energy data values comprises:
evaluating a conditional probability $P(y_t|x_{1:t})$ of the plurality of future unobserved solar energy data values given the time series of solar energy data values from $\sum_{k=1}^{K} P(s_t=k|x_{1:t})P(y_t|x_t, s_t=k)$, wherein $P(s_t=k|x_{1:t})$ is a conditional probability for the mode of day $s_t$ given the time series of solar energy data values $x_{1:t}$, $P(y_t|x_t, s_t=k)$ is a conditional probability of the plurality of future unobserved solar energy data values given the time series of solar energy data values $x_{1:t}$ and the mode of day $s_t$, wherein $P(y_t|x_t, s_t=k)$ is a Gaussian distribution with a mean $\tilde{m}_{yx(k,t)} C_{yx(k,t)} C_{xx(k,t)}^{-1}(x_t - m_{x(k,t)}) + m_{y(k,t)}$ and covariance $\tilde{C}_{yx(k,t)} = C_{yy(k,t)} - C_{yx(k,t)} C_{xx(k,t)}^{-1} C_{xy(k,t)}$, and the sum is over all modes; and
calculating the plurality of future unobserved solar energy data values $\tilde{y}_t$ from $\sum_{k=1}^{K} P(s_t=k|x_{1:t}) \tilde{m}_{yx(k,t)}$.

15. A non-transitory program storage device readable by a computer, tangibly embodying a program of instructions executed by the computer to perform the method steps for solar forecasting in order to manage a power grid, the method comprising the steps of:
receiving a time series of solar energy data values as a function of time of day at a first time t;
forecasting from the solar energy data a mode of day represented by the solar energy data, wherein the mode of day is one of a sunny day, a cloudy day, or an overcast day, and the forecast predicts the mode of day for a next solar energy datum;
receiving a new solar energy datum corresponding to the next solar energy datum, and updating a probability distribution function (pdf) of the new solar energy datum given the mode of day;
updating a pdf of the mode of day for the next solar energy datum from the updated pdf of the new solar energy datum given the mode of day;
forecasting a plurality of future unobserved solar energy data values from the updated pdf of the mode of day, wherein the plurality of future unobserved solar energy data values $y_t$ and the time series of solar energy data values $x_t$ have a Gaussian distribution for a given mode of day $s_t=k$ determined from a set of training data.

16. The computer readable program storage device of claim 15, wherein the Gaussian distribution for $y_t$ and $x_t$ for a given mode of day $s_t=k$ is $P(z_t|s_t=k)=N(z_t|m_{k,t}, C_{k,t})$, wherein $Z_t=[x_t, y_t]$ denotes a combined d-dimensional vector from $x_t$ and $y_t$,
where $m_{k,t}$ is a mean and $C_{k,t}$ is a covariance matrix determined by $$C_{k,t} = U_{k,t}(\Lambda_{k,t} - \sigma_{k,t}^2 I_q) U'_{k,t} + \sigma_{k,t}^2 I_d,$$

wherein $U_{k,t}$ is a d×q matrix whose columns correspond to eigenvectors of a first q principal components determined from the set of training data, $\Lambda_{k,t}$ is a diagonal matrix whose diagonal elements are the q dominant eigenvalues, $\sigma_{k,t}^2$ is a residual eigenvalue or an average of eigenvalues for a remaining (d−q)-dimensional subspace that is orthogonal to the q-dimensional principal eigenspace, and $I_q$ is a q×q identity matrix, and $m_{k,t}$ and $C_{k,t}$ are decomposed into parts corresponding to $x_t$ and $y_t$ such that $m_{k,t}=[m'_{x(k,t)}, m'_{y(k,t)}]'$ and $$C_{k,t} = \begin{bmatrix} C_{xx(k,t)} & C_{xy(k,t)} \\ C_{yx(k,t)} & C_{yy(k,t)} \end{bmatrix},$$

and prime indicates transpose.

17. The computer readable program storage device of claim 16, wherein forecasting a plurality of future unobserved solar energy data values comprises:
evaluating a conditional probability $P(y_t|x_{1:t})$ of the plurality of future unobserved solar energy data values given the time series of solar energy data values from $\sum_{k=1}^{K} P(s_t=k|x_{1:t})P(y_t|x_t, s_t=k)$ wherein $P(s_t=k|x_{1:t})$ is a conditional probability for the mode of day $s_t$ given the time series of solar energy data values $x_{1:t}$, $P(y_t|x_t, s_t=k)$ is a conditional probability of the plurality of future unobserved solar energy data values given the time series of solar energy data values $x_{1:t}$ and the mode of day $s_t$, wherein $P(y_t|x_t, s_t=k)$ is a Gaussian distribution with a mean $\tilde{m}_{yx(k,t)} = C_{yx(k,t)} C_{xx(k,t)}^{-1}(x_t - m_{x(k,t)}) + m_{y(k,t)}$ and covariance $\tilde{C}_{yx(k,t)} = C_{yy(k,t)} - C_{yx(k,t)} C_{xx(k,t)}^{-1} C_{xy(k,t)}$, and the sum is over all modes; and
calculating the plurality of future unobserved solar energy data values $\tilde{y}_t$ from $\sum_{k=1}^{K} P(s_t=k|x_{1:t}) \tilde{m}_{yx(k,t)}$.

18. The computer readable program storage device of claim 16, wherein determining the Gaussian distribution for a given mode of day $s_t=k$ from a set of training data comprises:
receiving a set of vectors z of solar energy time series for N training days, each with T time stamps;
classifying each day into a mode of day;
splitting the set of vectors into sub-vectors according to the mode of day, wherein there is one sub-vector for each mode of day;
determining the mean $m_{k,t}$ for each time stamp t from an average over all training days of mode k at time t;

for each data point $z_{t,k}$ at a time t in a sub vector for mode k, forming the training set from τ data values that precede $z_{t,k}$ and from τ data values that succeed $z_{t,k}$;

training a probabilistic principal component analyzer (PPCA) for each data point from training set for each data point using eigen decomposition to determine matrices $U_{k,t}$ and $\Lambda_{k,t}$, and the residual eigenvalue $\sigma_{k,t}^2$; and initializing a categorical probability for the mode of day and a transition probability for the mode of day to predetermined values.

19. The computer readable program storage device of claim 18, wherein the method further includes relearning the mean $m_{k,t}$, the matrices $U_{k,t}$ and $\Lambda_{k,t}$, the residual eigenvalue $\sigma_{k,t}^2$, and the transition probability for the mode of day using an expectation-maximization algorithm.

20. The computer readable program storage device of claim 18, wherein classifying each day into a mode of day comprises:

classifying a time series value at time t as noisy if an absolute gradient at time t is greater than a first predetermined threshold;

classifying a day as sunny if a percentage of noisy time series values is less than a second predetermined threshold;

calculating an upper envelop for all sunny day time series values;

defining a template for a cloudy day and a template for an overcast day from the sunny day envelop;

matching a non-sunny day time series against each template using an Euclidean distance; and determining whether a non-sunny day is cloudy or overcast based on a smaller corresponding distance.

21. The computer readable program storage device of claim 20, wherein the mode of day includes a general mode trained on all available data for data values that fall between two modes.

22. The computer readable program storage device of claim 15, wherein determining a mode of day from the solar energy data comprises evaluating a first conditional probability $P(s_t|x_{1:t-1})$ of the mode of day $s_t$ for the next solar energy datum given the time series of solar energy data values $x_{1:t-1}$ from a product $P(s_{t-1}|x_{1:t-1})P(s_t|s_{t-1})$, a second conditional probability $P(s_t|x))$ is a categorical distribution, $P(s_{t-1}|x_{1:t-1})$ is a third conditional probability for a previous solar energy datum at time t−1, and $P(s_t|s_{t-1})$ is a transition probability of a mode of day changing between time t−1 and time t.

23. The computer readable program storage device of claim 15, wherein the probability distribution function (pdf) $P(x_t|s_t)$ of the new solar energy datum given the mode of day is a multivariate Gaussian distribution, and updating the pdf of the mode of day for the next solar energy datum from the updated pdf of the new solar energy datum given the mode of day comprises evaluating $P(s_t|x_{1:t})$ from $P(s_t|x_{1:t-1})P(x_t|s_t)$.

* * * * *